US005629769A

United States Patent [19]

Cookingham et al.

[11] Patent Number: 5,629,769

[45] Date of Patent: May 13, 1997

[54] APPARATUS AND METHOD FOR THE MEASUREMENT OF GRAIN IN IMAGES

[75] Inventors: Robert E. Cookingham, Webster; Paul J. Kane, Rochester, both of N.Y.

[73] Assignee: Eastman Kodak Company, Rochester, N.Y.

[21] Appl. No.: 456,845

[22] Filed: Jun. 1, 1995

[51] Int. Cl.[6] .......... G01J 1/02

[52] U.S. Cl. .......... 356/243

[58] Field of Search .......... 356/243, 124.5

[56] References Cited

U.S. PATENT DOCUMENTS

| | | | |
|---|---|---|---|
| 2,641,158 | 6/1953 | Sweet | 356/444 |
| 4,213,708 | 7/1980 | Lucas | 356/429 |
| 4,977,521 | 12/1990 | Kaplan | 364/525 |
| 5,134,573 | 7/1992 | Goodwin | 364/525 |
| 5,140,414 | 8/1992 | Mowry | 358/81 |
| 5,264,924 | 11/1993 | Cok | 358/36 |
| 5,293,433 | 3/1994 | Bernsen et al. | 382/54 |
| 5,374,954 | 12/1994 | Mowry | 348/121 |

OTHER PUBLICATIONS

T. O. Maier and D. R. Miller, "The Relationship Between Graininess and Granularity" SPSE's 43 Annual Conference Proceedings, SPSE, Springfield, Virginia pp. 207–208 May 20–25, 1990.

C. J. Bartleson, "Predicting Graininess from Granularity", The Journal of Photographic Science, 33, pp. 117–126 (1985).

D. M. Zwick and D. L. Brothers, "RMS Granularity: Determination of Just–Noticeable Differences", SMPTE, 86, pp. 427–430, Jun. 1977.

"Print Grain Index–An Assessment of Print Graininess for Color Negative Films", Kodak Publication No. E–58, CAT 887 5809, Jun. 1994.

J. C. Dainty and R. Shaw, "Image Noise Analysis and the Wiener Spectrum", Image Science Academic Press, New York, Chapter 8 (1974).

*Primary Examiner*—Frank Font
*Assistant Examiner*—Amanda Merlino
*Attorney, Agent, or Firm*—Edward Dugas

[57] ABSTRACT

A generalized grain ruler incorporating a plurality of uniform patches representing a range of granularities, each patch being a perceptually distinct representation of graininess spaced at perceptually uniform intervals and recorded in an increasing sequence of graininess. A method for producing a generalized grain ruler for the measurement, by comparison of, grain in a reference imaging system generated image, comprising, the steps of:

a) generating a set of random numbers for each image component;

b) filtering each set of random numbers to alter the Wiener spectrum to result in a filtered set of random numbers that look as if they were generated by the reference photographic system; and c) delivering the filtered set of random numbers to an output device that renders them into an image which is the generalized grain ruler.

4 Claims, 5 Drawing Sheets

APPARATUS AND METHOD FOR THE MEASUREMENT OF GRAIN IN IMAGES

FIELD OF THE INVENTION

This invention relates to an improved apparatus and method for the measurement of grain in imaging systems and more particularly to an improved ruler for comparing ruler patches against an image generated by a reference system and a method for making the ruler.

BACKGROUND OF THE INVENTION

In designing an image capture and reproduction system, it is important to be able to determine the magnitude of the level of image degradation to be expected in the final image as viewed by the observer. Understanding the magnitude of the image degradations due to grain is also important to the use of the image reproduction system and can have a major impact on the selection of key elements for use in the imaging chain. For example, in a photographic system, the selection of a film speed, film format, and film type are determined by the image to be captured and the end use of the final image. The film grain also becomes important depending on the degree of enlargement anticipated for the final print.

In a photographic system, the variations in otherwise uniform responses to exposing light are referred to as grain. These variations in the density can be observed through physical measurement by measuring the optical density of photographic materials, such as film or paper, with a microdensitometer. The root mean square (rms) value or standard deviation is used as a measure of the variation in density of an otherwise uniform area. This value is referred to as the granularity. A photographic image is perceived by an observer and the perception of these unwanted, random fluctuations in optical density are called graininess. Thus, the physically measured quantity of granularity is perceived by the observer as a level of graininess.

The first grain slide or ruler was designed and fabricated by Thomas Maier et al. (See for example, T. O Maier and D. R. Miller, "*The Relationship Between Graininess and Granularity*" SPSE's 43 Annual Conference Proceedings, SPSE, Springfield, Va. pp207–208, (1990)). The fundamental relationship relating the granularity and graininess was determined by C. James Bartleson (See for example, C. J. Bartleson, *The Journal of Photographic Science*, 33, pp117–126, (1985)). He determined the following relationship between the graininess $G_i$ and the granularity $\sigma_v$ $$G_i = a*\log(\sigma_v)+b \qquad \text{Eq. (1)}$$

where a and b are constants. He also determined that the perceived graininess did not depend on the color of the image, thus graininess was found to be strictly a function of the achromatic channel of the visual system.

Maier et al. produced a series of uniform neutral patches of grain at the same average density with increasing amounts of grain using a digital simulation instrument. They then used microdensitometer measurements and the fundamental psychophysical relationship to relate the graininess to the rms granularity. This was accomplished by assuming that a 6% change in granularity would correspond to a 2 unit change in graininess, or grain index. As a result of this assumption, the constant multiplying the lead term must be 80 since the log range of the ruler patches was 1.2 or about 48 times log of (1.06). They then assumed the lowest patch was grainless and assigned it an arbitrary value of 25. The following equation resulted $$G_i = 80*\log(\sigma_v)-28.64 \qquad \text{Eq. (2)}$$

Then a series of 18 uniform neutral samples of increasing grain were assigned train index numbers in 17 unequal steps from 25 to 120 depending on the measured granularity. The final grain ruler consisted of two scales printed on black and white photographic paper mounted on a rigid backing material.

The resulting grain ruler was then used as a scaling tool to evaluate the graininess in other photographic materials. Such other materials consisted primarily of photographic materials with either uniform areas or images printed on them. In the form described above the grain ruler suffers from several significant deficiencies.

In use on contemporary photographic materials, the ruler led to widely divergent measurements by individual users. Measurements on colored photographic materials led to the most widely varying results. Since most current photographic materials are colored in nature, this is a serious deficiency. The non uniform scale of the original ruler, the arbitrary range of sample grain levels, and the layout as two separate rulers led to further difficulties in use. In addition, the method of generating the ruler failed to take into account the different look that grain has in different imaging systems, and did not address how one might model or display the impact grain would have in images rendered in media and materials other than silver halide photographic materials. The display of grain rendered in video and other modern optoelectronic output devices was also not addressed.

SUMMARY OF THE INVENTION

The present invention is directed to overcoming one or more of the problems set forth above. Briefly summarized, according to one aspect of the present invention a generalized grain ruler incorporating a plurality of uniform patches representing a range of granularities, each patch being a perceptually distinct representation of graininess spaced at perceptually uniform intervals and recorded in an increasing sequence of graininess According to another aspect of the present invention there is provided a method for producing a generalized grain ruler for the measurement by comparison of grain in a reference imaging system generated image, comprising, the steps of:

a) generating a set of random numbers for each image component;

b) filtering each set of random numbers to alter the Wiener spectrum to result in a filtered set of random numbers that look as if they were generated by the reference photographic system; and c) delivering the filtered set of random numbers to an output device that renders them into an image which is the generalized grain ruler.

The above and other objects of the present invention will become more apparent when taken in conjunction with the following description and drawings wherein identical reference numerals have been used, where possible, to designate identical elements that are common to the Figures.

ADVANTAGEOUS EFFECTS OF THE INVENTION

The present invention has the following advantages: It provides a more precise measurement apparatus for photographic materials and a method and means for producing a ruler. Furthermore, the method and means of producing the ruler need not be limited to conventional photographic materials, but can be applied generally to any image rendering system including optoelectronic systems. It does allow for production using colored photographic materials, measurement of colored photographic materials, a perceptually uniform scale, and a range of graininess levels relevant to current photographic products.

DETAILED DESCRIPTION OF THE INVENTION

Figure 1:
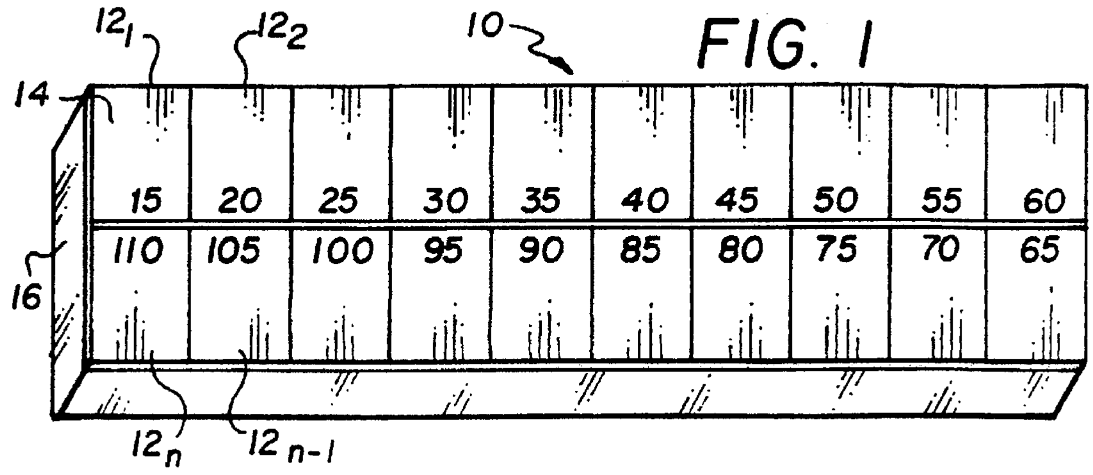
FIG. 1 is a schematic diagram of an improved grain ruler in accordance with a preferred embodiment of the invention showing the arrangement of the uniform neutral patches containing specified amounts of grain.

Referring to FIG. 1, an improved grain ruler 10 in accordance with a preferred embodiment of the invention consists of a plurality of uniform neutral patches $\mathbf{12}_1 \ldots \mathbf{12}_n$ on a color reflection print material 14 which is mounted onto a rigid backing material 16. Each patch 12 is a uniform neutral area containing a prescribed amount of photographic grain. The patches are selected to span the levels of graininess from the lowest levels of image grain to the highest usable level of image grain currently present in the trade. In other words, the patches are selected based on their proposed use. At any point in time film producers manufacture a range of films each having a different granularity. Patches would be selected to include the granularities of those films. In addition, these films will be subjected to different magnification factors when the films are printed or electronically displayed. For maximum ruler utility the patches should represent the range of available film granularity and the range of magnifications that are used in the film processing industry. In addition, these patches should be spaced at perceptually uniform intervals. In accordance with Eq. 1, perceptually uniform intervals (an arithmetic sequence) of graininess correspond to constant geometrical changes in granularity. The spacing of the patches should be chosen to be large enough so that nearly all observers agree that the patches represent distinct levels of graininess, while at the same time small enough that observers can use the ruler to determine the graininess of a test sample with adequate precision.

In the preferred embodiment, Eq. 1 is used to establish a numerical scale relating the perceived graininess of each patch to the measured granularity of each patch. The constant "a" multiplying the lead term of Eq. 1 is selected to be 80, so that a 2 unit change in graininess corresponds to a 6% change in granularity. It is known that a 6% change in granularity is perceived as a just noticeable change in graininess by 80% of observers in a forced choice paired comparison (see D. M. Zwick and D. L. Brothers, "*RMS Granularity: Determination of Just-Noticeable Differences*", SMPTE, 86, pages 427–1430, 1977). In the preferred embodiment, the ruler patches are set at intervals of 5 graininess units, to optimize the precision of the ruler as described above. The constant "b" in Eq. 1 is assigned a value of −25. This aligns the numerical scale to the industry standard scale (see "*Print Grain Index-An Assessment of Print Graininess for Color Negative Films*", Kodak Publication No. E-58, CAT 887 5809, 1994).

The patches 12 are sorted in an ascending order of perceived graininess and are labeled with a numerical value indicating the graininess of each patch, and are abutted so as to form a scale of graininess. The scale of graininess proceeds from the lowest level in the upper left corner number 15, to moderate levels in the upper right corner 60, and lower right corner 65, to the highest level in the lower left corner 110.

Figure 2:
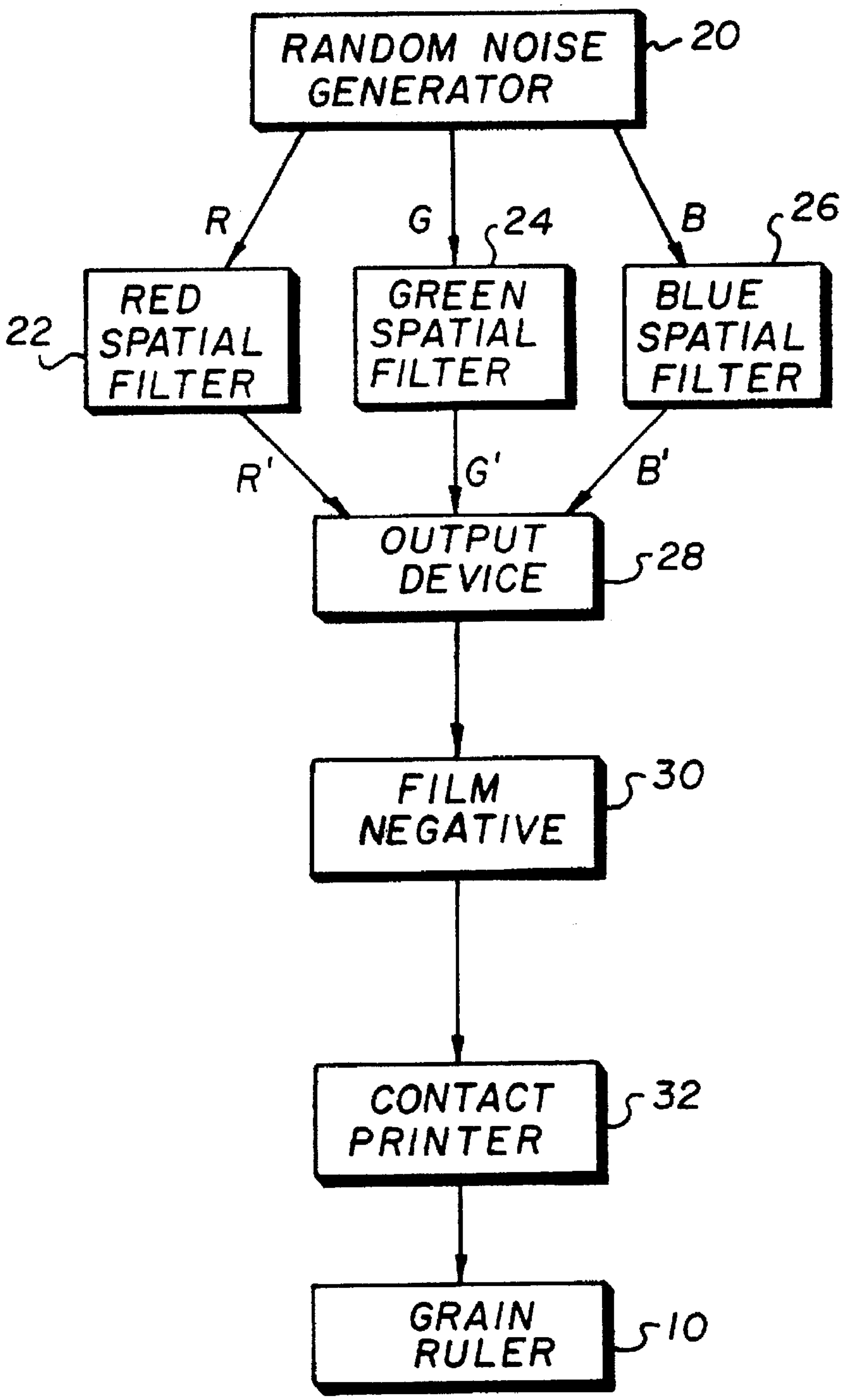
FIG. 2 is a flow chart illustrating the method used to produce the improved grain ruler apparatus of FIG. 1.

Referring to FIG. 2, the process used to produce the grain ruler 10 of FIG. 1 commences with a random noise generator 20 and includes the use of spatial filters 22, 24, and 26, an output device 28, a film negative 30, and a contact printing apparatus 32.

The random noise generator 20 is used to create three sets of 16 bit random numbers representing the red, green, and blue (R, G, and B) pixel components in the patches 12. These three sets of numbers represent the red, green and blue photographic grain patterns to be manipulated and transferred to the grain ruler scale. The random numbers have the following properties:

1. The mean value of the R, G and B numbers is such that the resulting uniform area on the grain ruler can be made substantially neutral, with a visual density of 0.8.
2. The standard deviation of the R, G, and B numbers is such that the prescribed amount of photographic grain is produced in the resulting uniform area on the grain ruler.
3. The R, G, and B numbers are normally distributed.
4. The R, G, and B numbers are spatially uncorrelated, such that each number in the sequence is independent of those preceding and following.
5. The R, G, and B numbers are substantially independent of each other.

The R, G, and B numbers are subsequently modified by spatial filters 22, 24, and 26, using well known techniques of discrete convolution, to produce sets of random numbers R', G', and B'. This process is repeated for each patch of the grain ruler. For each patch, the standard deviation of the R, G, and B numbers is selected. The spatial filters 22, 24, and 26 are chosen such that the resulting grain pattern has a particular look (appearance). An important feature of the invention is that the particular look of the grain patterns on the grain ruler is substantially the same as the look of the grain patterns produced by the imaging system whose grain the grain ruler is intended to measure. This is accomplished by adjusting the modulation transfer function (MTF) of the image generation process, so that the MTF of said image generation process matches the MTF of the imaging system whose grain the grain ruler is intended to measure. For instance, the MTF of the image generation process is substantially determined by the MTF associated with the spatial filters 22, 24, and 26, the output device 28, the film negative 30, the contact printer 32, and the color reflection print material 14 on which the grain ruler is recorded. The system MTF is a function of spatial frequency and color channel.

For example, the MTF of the image generation process for the red channel may be written:

$$MTF_R(f)=(MTF_{22}(f))(MTF_{28,R}(f))(MTF_{30,R}(f))\ (MTF_{32,R}(f))(MTF_{14,R}(f)) \quad \text{Eq. (3)}$$

where f is the spatial frequency in cycles/mm on the grain ruler. Analogous equations can be written for the blue and green channels.

Figure 3:
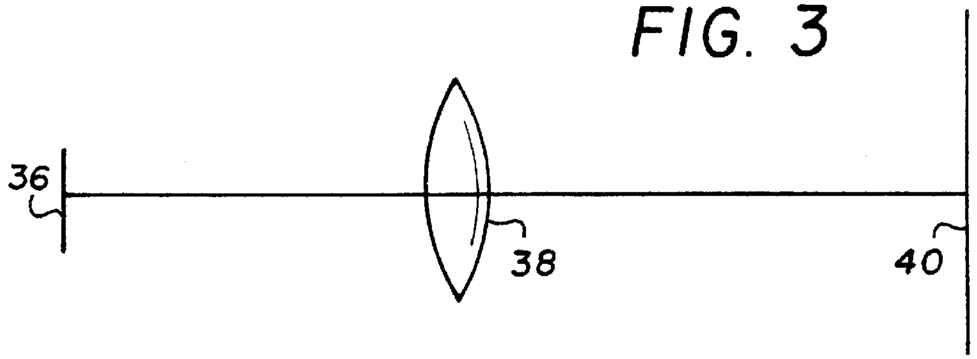
FIG. 3 illustrates a functional arrangement of a color negative photographic enlarging system.

In the preferred embodiment, the imaging system whose grain the grain ruler is intended to measure, termed the reference system, is a color negative photographic system. Referring to FIG. 3, the reference system is composed of a color negative film 36 which is magnified by an enlarging lens 38 onto a color reflection print material 40. The look of the photographic grain produced by the reference system is substantially determined by the MTF of the enlarging lens and the MTF of the color reflection print material. The MTF of the red channel of the reference system may be written:

$$MTF_{reference,R}(f)=(MTF_{38,R}(f))(MTF_{40,R}(f)) \quad \text{Eq. (4)}$$

Analogous equations may be written for the green and blue channels. The spatial filters 22, 24, and 26 are used to accomplish the match of the MTF of the reference system with that of the image generation system. The spatial frequency response of the filters is determined by combining the above equations and solving for the desired spatial filter MTF. For example, the MTF of the spatial filter 22 is given by:

$$MTF_{22}(f)=\frac{(MTF_{38,R}(f))}{(MTF_{28,R}(f))\ (MTF_{30,R}(f))\ (MTF_{32,R}(f))} \quad \text{Eq. (5)}$$

In the preferred embodiment of the invention the MTF of the color reflection print material has been eliminated from Eq. 5, since the same print material is used in both the reference system and the image generation process. If this is not the case, separate terms representing the MTF of the relevant reflection print material must be retained.

It will be appreciated, upon inspection of Eq. 5, that once an image generation system is chosen, so that the MTF associated with components 28, 30, and 32 is fixed, the MTF of the spatial filters 22, 24, and 26 is substantially determined by the MTF associated with the enlarging lens of the reference system.

Figure 4A:
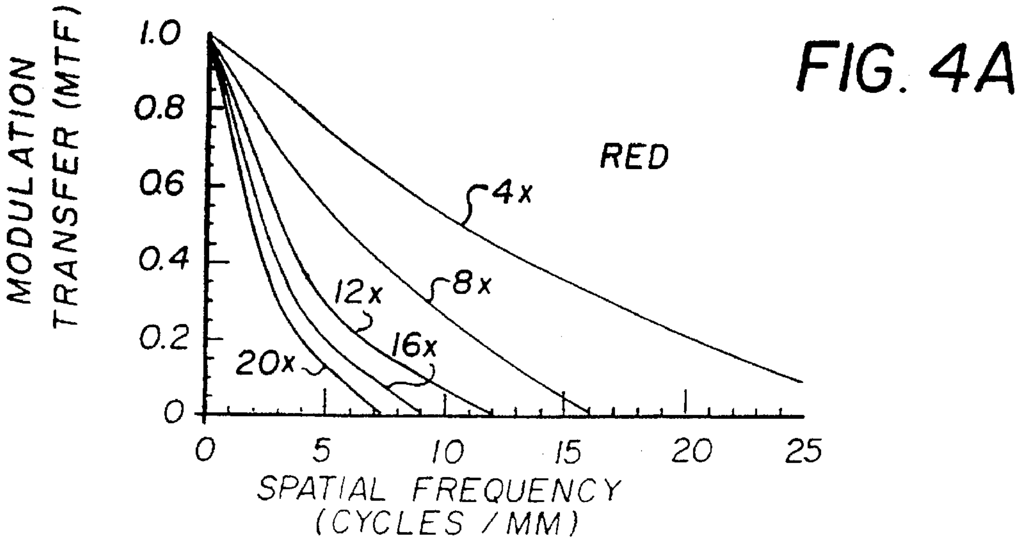
FIGS. 4A, 4B, and 4C demonstrate, for the case of a high quality enlarging lens, the behavior of the lens MTF with respect, to the color channel and printing magnifications of 4x, 8x, 12x, 16x, and 20x.
Figure 4B:
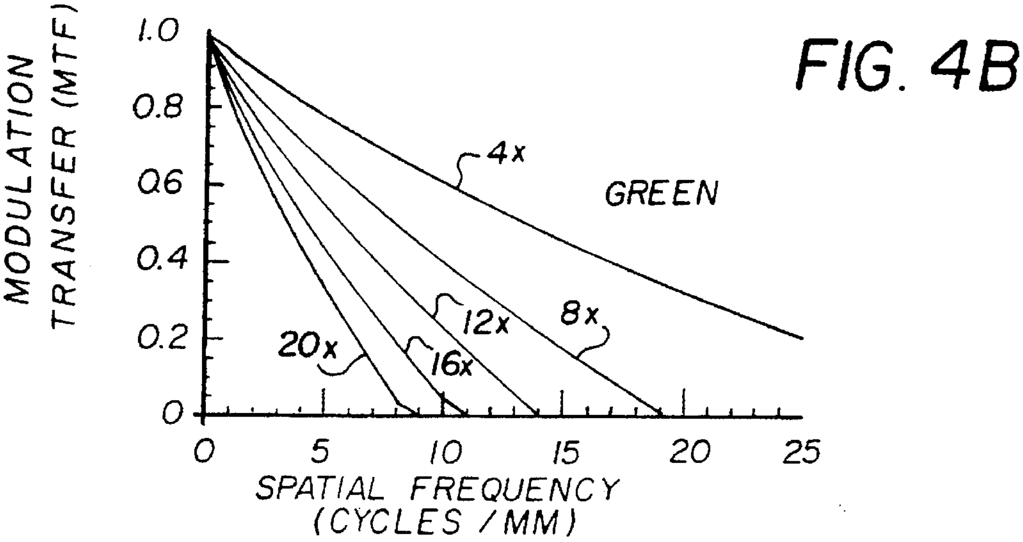
Figure 4C:
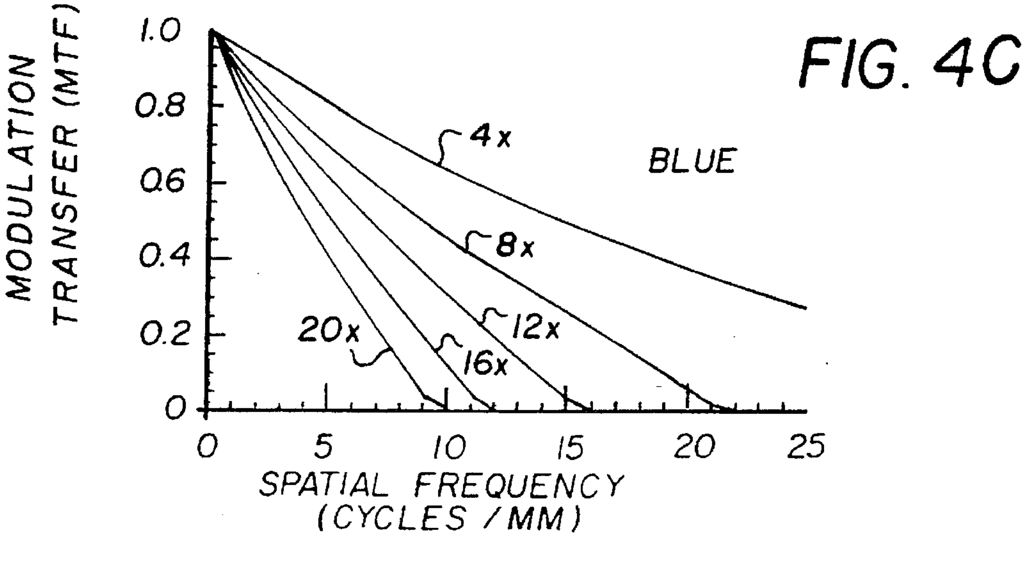

FIGS. 4A, 4B, and 4C illustrate by way of graphs the behavior of a high quality lens MTF with respect to the R, G, and B, color channels and printing magnifications of 4x, 8x, 12x, 16x, and 20x. The spatial frequency axes refers to the spatial frequency on the print. Two significant trends are evident: first, that the lens MTF becomes poorer as the magnification increases from 4x to 20x, and second, that the MTF varies between the color channels, being substantially poorer for the red channel compared to the blue and green channels.

In the preferred embodiment, the look of the grain ruler grain patterns will change from the lowest patch to the highest patch, such that the grain patterns will appear to be blurred to an increasing degree as the overall graininess increases. This is in accord with the behavior of the enlarging lens, whose MTF becomes poorer as the magnifications increases, and the fact that most low graininess prints will be made at low magnifications, while most high graininess prints are made at high magnification. In the preferred embodiment, the grain ruler grain patterns should exhibit a gradual change in sharpness from patch to patch.

The response curves of FIGS. 4A, 4B, and 4C were interpolated to produce a series of 20 MTF curves for each color channel, ranging from the best MTF curve at 4x magnification, corresponding to the lowest graininess patch on the grain ruler, to the poorest MTF at 20x magnification, corresponding to the highest graininess patch on the grain ruler.

Referring back to FIG. 2, the random numbers representing R', G', and B' corresponding to each patch of the grain ruler are sent to an output device 28, which produces a film negative 30 of substantially uniform density, on which an image of computer generated photographic grain patterns has been recorded. The film negative 30 is then placed in a contact printing apparatus 32, which produces a grain ruler 34 on color reflection print material 14. The contact printing apparatus 32 is adjusted so that the uniform areas on the grain ruler 10 are substantially neutral in appearance, with a corresponding average visual density of 0.8.

To verify that the grain ruler 10 meets the specifications, each patch was scanned using a reflection microdensitometer with nominal ANSI Status M red, green, and blue spectral responses, and the WS of each patch was estimated using standard techniques. For example see, J. C. Dainty and R. Shaw, "*Image Noise Analysis and the Wiener Spectrum*", Image Science, Academic Press, New York, Chapter 8, (1974).

Figure 5A:
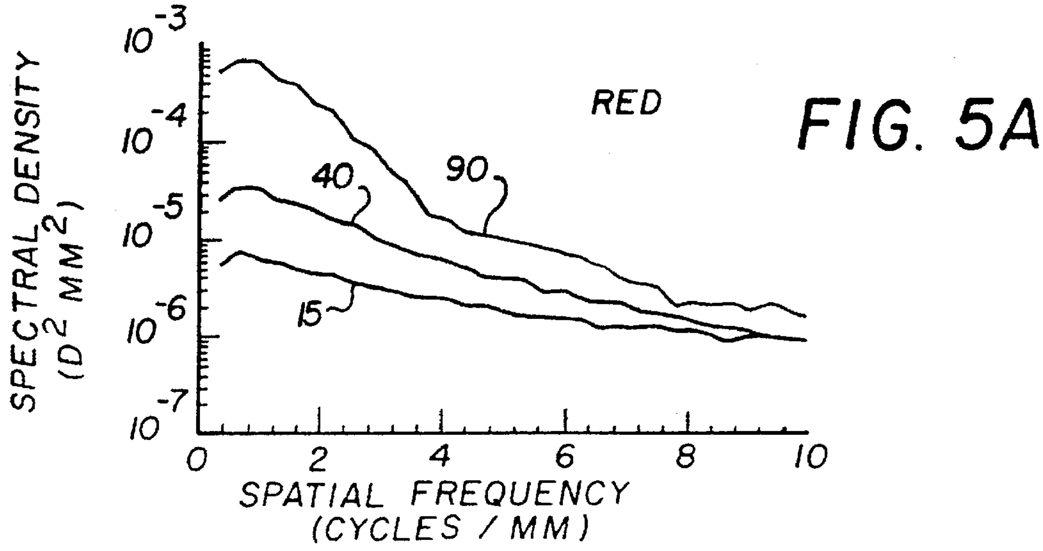
FIGS. 5A, 5B, and 5C are graphs illustrating the measured Wiener Spectrum in each of the three color channels, respectively, for selected ruler steps.
Figure 5B:
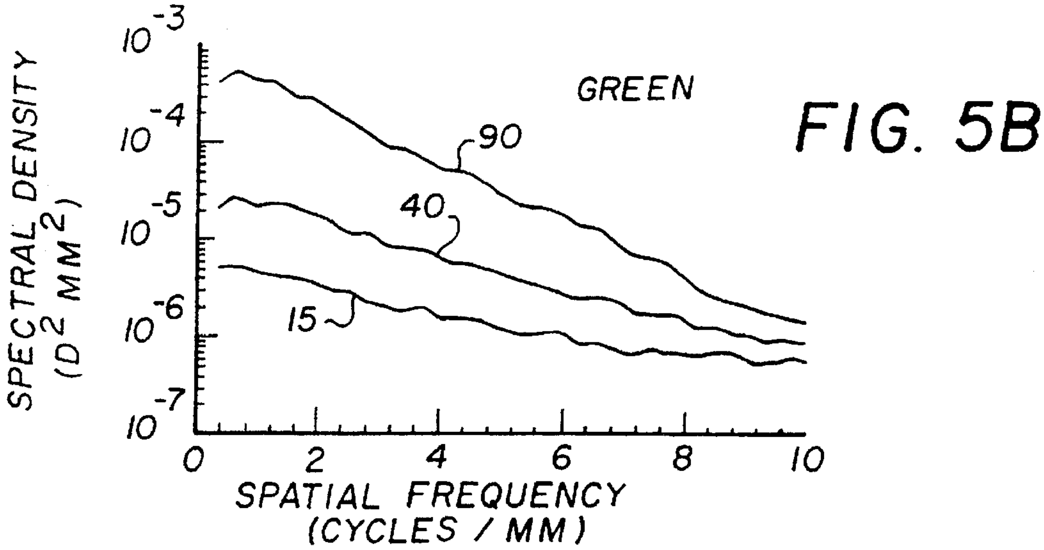
Figure 5C:
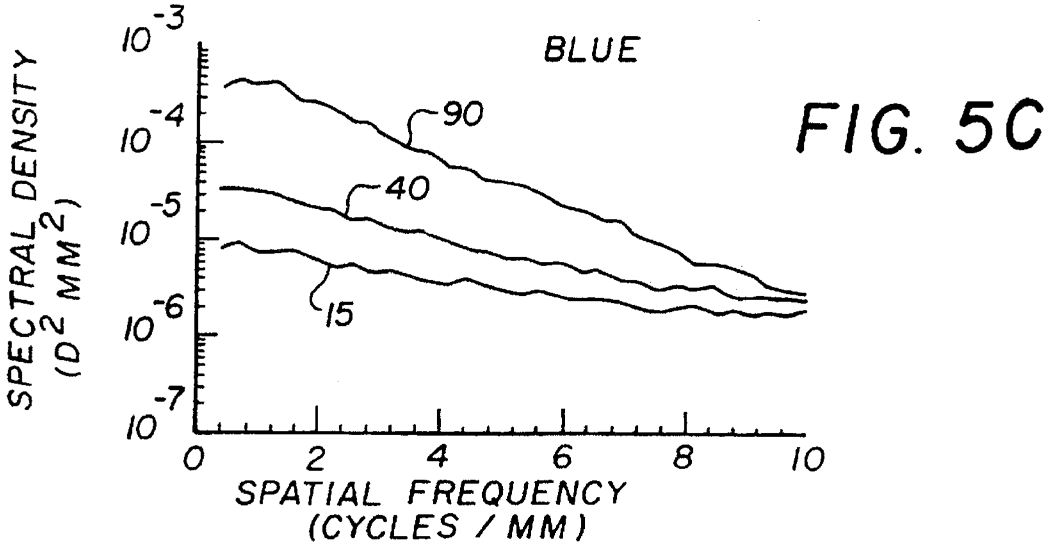

FIG. 5A shows the red WS for ruler patches 15, 40, and 90. FIG. 5B shows the green WS, and FIG. 5C shows the blue WS for the same patches. As expected, the WS level increases faster at the lower spatial frequencies than at the higher spatial frequencies, in accordance with the graphs shown in FIGS. 4A, 4B, and 4C. Also, the red WS is lower in the higher spatial frequencies than the green or blue.

Figure 6:
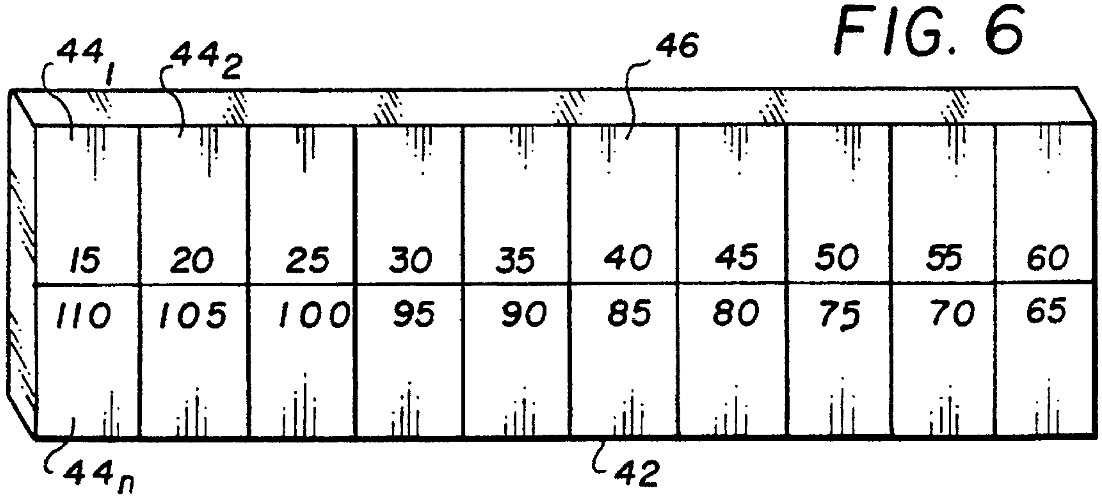
FIG. 6 is a schematic diagram of a generalized grain ruler in accordance with an alternate embodiment of the invention showing the arrangement of the uniform patches containing specified amounts of grain.

An alternate embodiment of the invention is shown in FIG. 6. A generalized grain ruler 42 consists of a plurality of uniform patches $\mathbf{44}_1 \ldots \mathbf{44}_n$ on a display medium 46. The display medium 46 on which the generalized grain ruler 42 is rendered may include, but is not limited to:

1. color negative photographic paper
2. color reversal photographic paper
3. black and White photographic paper
4. color reversal transmission material
5. color negative transmission material
6. color electrophotographic material
7. black and White electrophotographic material
8. color thermal print paper
9. color video monitor
10. motion picture projection screen
11. color slide projection screen Each patch 44 is a uniform area containing a prescribed amount of grain. The range of grain levels spanned by the patches is selected based on their proposed use. As described earlier, the precision of the ruler is optimized when the patches are spaced at perceptually uniform grain intervals, said intervals as small as possible, but large enough that the patches remain perceptually distinct. The patches 44 are sorted in an ascending order of perceived grain, are labelled with a numerical value indicating the perceived grain of each patch, and are abutted so as to form a scale of perceived graininess. The patches shown in FIG. 6 are labelled in the same manner as those shown in FIG. 1; any labelling method that is consistent with Eq. 1 is acceptable.

Figure 7:
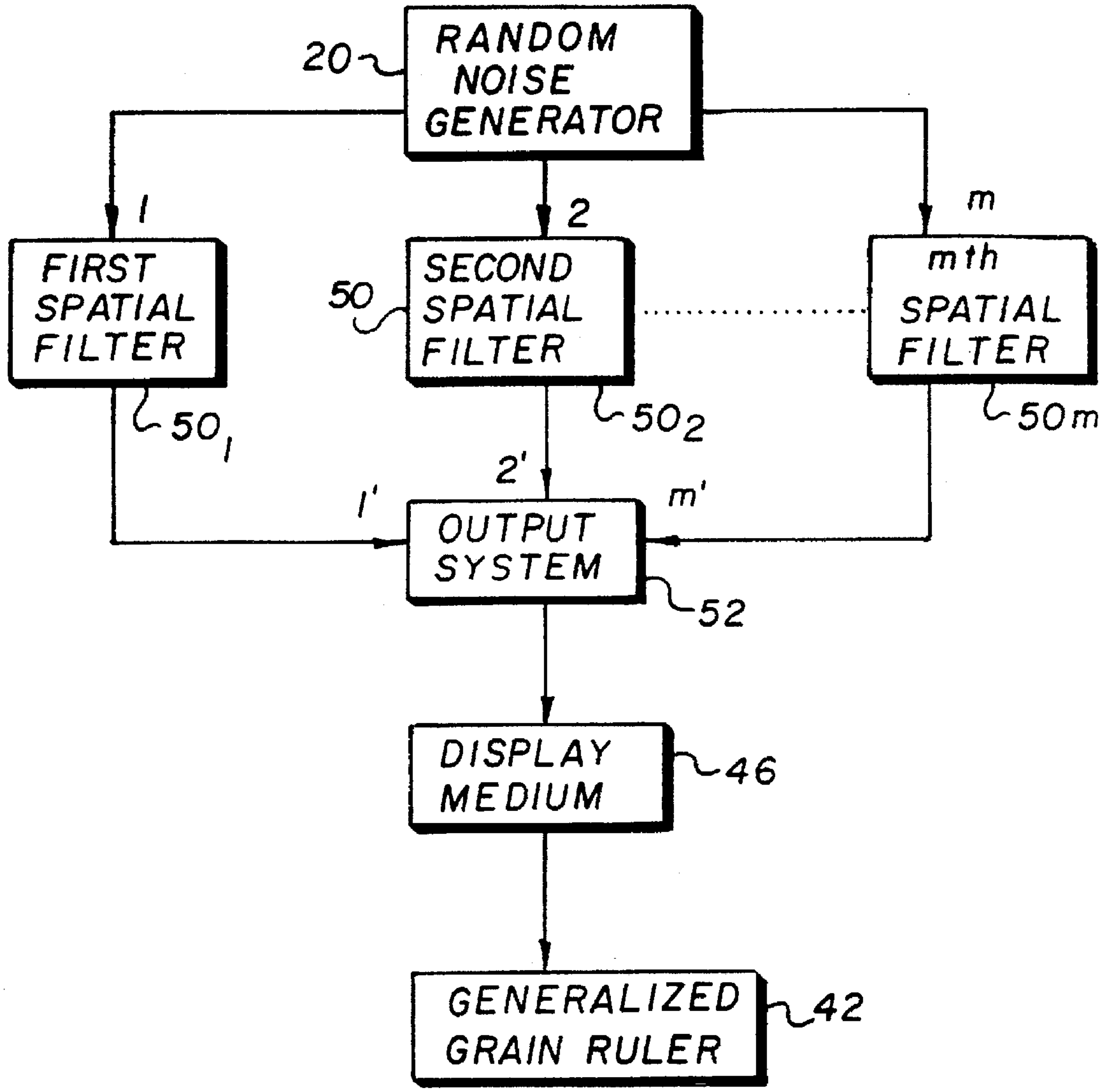
FIG. 7 is a flowchart illustrating the method used to produce the generalized grain ruler apparatus of FIG. 6.

FIG. 7 illustrates the method for the construction of the generalized grain ruler 42. The process again commences with the random number generator 20, and includes the use of spatial filters $\mathbf{50}_1, \mathbf{50}_2 \ldots \mathbf{50}_m$, and an output system 52. The random number generator 20 is used to create m sets of 16-bit random numbers, denoted 1, 2, . . . m, representing the pixel components in the patches 44. The number m is commensurate with the number of chromatic channels pertaining to the system whose grain the generalized grain ruler is intended to measure. For example, a generalized grain ruler intended for use with a single channel (black and white) imaging system may require the use of only one set of random numbers. Or, in another example, a generalized grain ruler intended for use with certain thermal print systems may require the use of four sets of random numbers, corresponding to cyan, magenta, yellow and black (CMYK) channels. The m sets of numbers represent the grain patterns to be manipulated and transferred to the generalized grain ruler scale. The random numbers have the following properties:

1. The mean value of each set of numbers is such that the resulting uniform area on the generalized grain ruler can be made to the desired average density.

2. The standard deviation of each set of numbers is such that the prescribed amount of grain is produced in the resulting uniform area on the generalized grain ruler.

3. The random numbers 1, 2, . . . m follow a prescribed unimodal distribution.

4. The random numbers, 1, 2, . . . m are spatially uncorrelated, such that each number in the sequence is independent of those preceding and following.

5. The sets of random numbers 1, 2, . . . m are mutually independent.

The random numbers 1, 2 . . . m are subsequently modified by spatial filters $\mathbf{50}_1 \ldots \mathbf{50}_m$, using well known techniques of discrete convolution, to produce sets of random numbers 1', 2'. . . m'. This process is repeated for each patch of the generalized grain ruler. For each patch, the standard deviation of the numbers 1, 2 . . . m is selected. The spatial filters $\mathbf{50}_1 \ldots \mathbf{50}_m$ are chosen such that the resulting grain pattern has a particular look (appearance). Again, the MTF of the image generation process is adjusted so that the MTF of said image generation process matches the MTF of the imaging system whose grain the ruler is intended to measure. Referring to FIG. 7, the MTF of the image generation process for the first channel may be written:

$$MTF_1(f)=(MTF_{50,1}(f))(MTF_{52,1}(f))(MTF_{46,1}(f)) \quad \text{Eq. (6)}$$

where $MTF_{50,1}(f)$ denotes the MTF of spatial filter $\mathbf{50}_1$. Analogous equations can be written for the remaining chromatic channels. In this embodiment, the reference system can be any imaging system which can be described by a Modulation Transfer Function. The MTF of the spatial filter $\mathbf{50}_1$ is given by:

$$MTF_{50,1}(f) = \frac{MTF_{reference,1}(f)}{MTF_{52,1}(f)\, MTF_{46,1}(f)}$$

Analogous equations can be written for the remaining spatial filters. Referring to FIG. 7, the random numbers 1', 2' . . . m' corresponding to each patch of the generalized grain ruler are sent to an output system 52, which renders the generalized grain ruler 42 on the display medium 46, at the desired uniform density. In this embodiment the output system 52 is presumed to include such components as necessary to produce the desired rendition on the display medium 46.

Parts List

| | |
|---|---|
| 10 | grain ruler |
| $12_1 \ldots 12_n$ | patches |
| 14 | color reflection print material |
| 16 | backing material |
| 20 | random noise generator |
| 22 | red spatial filter |
| 24 | green spatial filter |
| 26 | blue spatial filter |
| 28 | output device |
| 30 | film negative |
| 32 | contact printer |
| 36 | color negative film |
| 38 | enlarging lens |
| 40 | color reflection print material |
| 42 | generalized grain ruler |
| $44_1 \ldots 44_n$ | patches |
| 46 | display medium |
| $50_1 \ldots 50_m$ | spatial filters |
| 52 | output system |

What is claimed is:

1. A generalized grain ruler incorporating a plurality of uniform patches representing a range of granularities, each patch being a perceptually distinct representation of graininess spaced at perceptually uniform intervals and recorded in an increasing sequence of graininess.

2. A grain ruler incorporating a color reflection print material, said reflection print material having recorded thereon a plurality of uniform neutral patches representing a range of granularities each patch being a perceptually distinct representation of graininess recorded in an arithmetically increasing sequence of graininess.

3. The grain ruler according to claim 2 and further comprising:

a rigid backing material providing physical support to said reflection print material.

4. The grain ruler according to claim 2 wherein said plurality of neutral patches are recorded in rows on a single piece of reflection print material.

* * * * *